Figure 2:
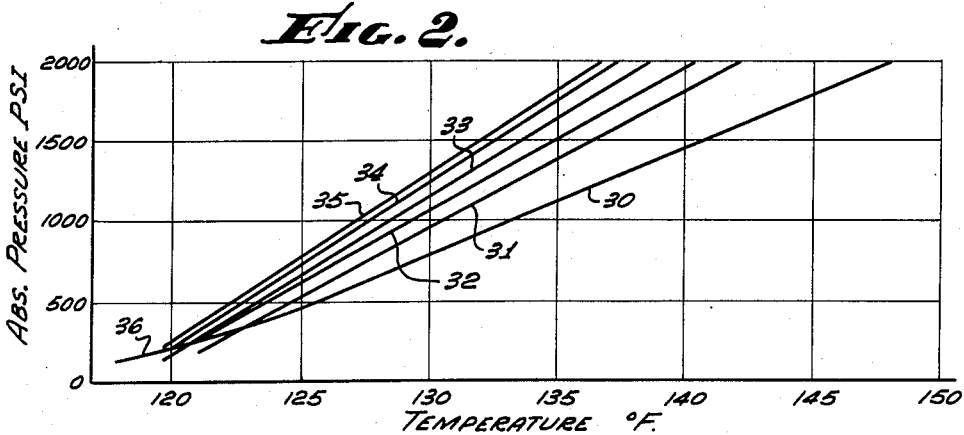

July 12, 1960 D. T. LANG 2,944,423
TEMPERATURE SENSING BY PRESSURIZED LIQUID MIXTURES
Filed Sept. 9, 1955 2 Sheets-Sheet 1
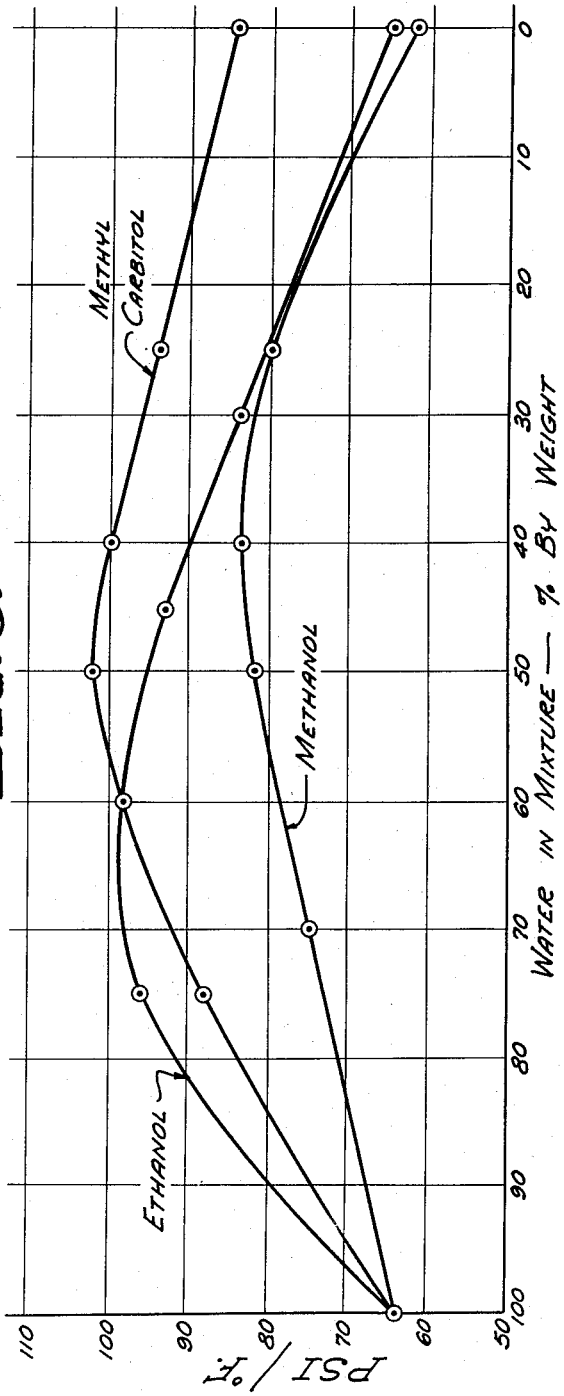
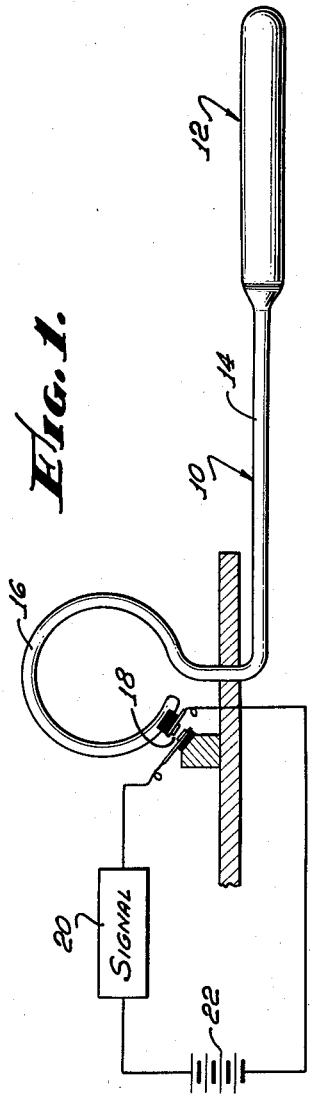
INVENTOR.
DELMER T. LANG
BY
ATTORNEY.

INVENTOR.
DELMER T. LANG
BY
ATTORNEY.

United States Patent Office 2,944,423
Patented July 12, 1960

2,944,423
TEMPERATURE SENSING BY PRESSURIZED LIQUID MIXTURES

Delmer T. Lang, Palos Verdes Estates, Calif., assignor, by mesne assignments, to Delmer T. Lang Filed Sept. 9, 1955, Ser. No. 533,379

15 Claims. (Cl. 73—368)

This invention is directed generally to the sensing and measurement of temperature changes by means responsive to pressure changes of liquids, and particularly to the use of a mixture of a plurality of liquids confined under virtually constant volume in a closed system and under superatmospheric pressure.

Typically in the practice of the present invention there is provided a completely closed hermetically tight system wholly filled by a substantially gas-free liquid mixture of two or more component liquids. The system may include a portion arranged to be exposed to and sense a temperature to be indicated. A portion of the system includes means responsive to changes of pressure of the liquid mixture resulting from the temperature changes sensed. Such pressure responsive means may take any of many forms; a preferred form of the invention hereinafter illustrated and described employs a Bourdon tube as the pressure responsive means, the Bourdon tube being adapted to make or break electrical contacts associated therewith upon appropriate changes of pressure of the fluid within the tube.

In a system of the sort just referred to it is desirable that a large pressure change per unit temperature change be obtained. In general, the larger such incremental pressure change, the more sensitive and accurate will be the instrument. As will appear hereinafter I have observed that, under conditions of relatively high pressure, certain mixtures of miscible liquids display the property that the incremental pressure change per unit temperature change of the liquid mixture is substantially greater than the incremental pressure change of any of the liquids alone. The exact proportion of the liquids to yield the maximum incremental pressure change varies somewhat depending upon the particular liquids in the mixture, but it may be said that the point of maximum incremental pressure change appears generally when the mixture contains at least about 20% of each of the component liquids used.

Since the present invention contemplates a closed virtually constant volume system containing a mixture of two or more component liquids under superatmospheric pressure, the compressibility of the liquids used under these conditions is a factor of importance in selecting appropriate liquids. Water, which has a relatively low coefficient of compressibility, is preferred as one of the liquids in the mixture. When a mixture of two liquids is used, the other component liquid may be selected from among organic liquids such as the alcohols, ethers and others, according to the particular requirements of a specific application, so long as the liquids used are miscible. Illustrative combinations of water with exemplary liquids of this character will be discussed in detail hereinafter. In general mixtures suitable for use in accordance with the present invention are those of miscible, non-reactive component liquids; one component liquid should be polar and the other moderately polar.

A particular advantage found in the use of liquid mixtures of this type in a pressurized, virtually constant volume system is that the plot of pressure versus temperature is virtually linear over a very wide range of pressures, say from about 150 to 2000 p.s.i. Heretofore conventional liquid filled temperature indicating devices operating at low pressure have been subject to errors in calibration when ambient pressure changes occur as in the case of an aircraft operating from ground level up to high altitudes where atmospheric pressure may be five p.s.i. or less. By charging the mixture into the system at an initial superatmospheric pressure, the pressure of the system is above the vapor pressure of the liquid at any temperature within the working range, which may extend as low as —70° F. By controlling the temperature and pressure conditions under which the system is charged, the usable working temperature range may be varied within wide limits, the lower limit being established principally by the approach to the freezing point of the mixture and the upper limit by the approach to the temperature at which disassociation begins.

An object of the present invention is therefore to disclose a method of sensing and indicating temperature change employing pressurized liquid mixture in a virtually constant volume system.

Another object of this invention is to provide a temperature sensing and indicating device employing a liquid mixture confined under virtually constant volume conditions wherein pressure change of the liquid mixture is virtually linear with temperature change over a desired temperature range.

Another object of the invention is to disclose a temperature sensing and indicating system of the above character wherein the pressure of the enclosed liquid mixture is at least about 150 p.s.i. at the lower limit of the selected working range of the instrument.

A further purpose of the invention is to disclose a virtually constant volume liquid-filled temperature sensing and indicating system wherein the liquid is a mixture containing at least about 20% by weight of water and an organic liquid.

A still further purpose is to provide a virtually constant volume temperature responsive system filled with a pressurized liquid mixture of miscible non-reactive liquid components.

Other advantages, objects and purposes of the invention will become clear from the following description of preferred embodiments thereof taken with reference to the accompanying drawings in which:

Fig. 1 is a representation of a typical liquid-filled closed system for practicing the invention including a simplified electrical signal circuit energized by increase of pressure of the confined liquid mixture.

Figure 3:
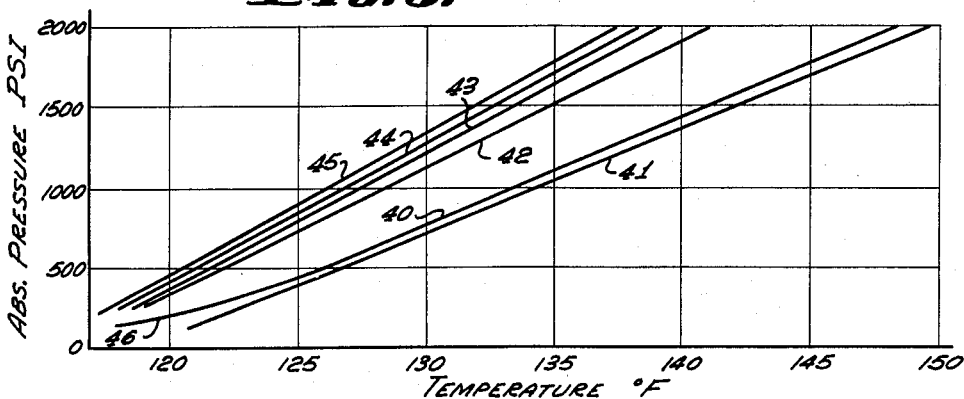
Figure 4:
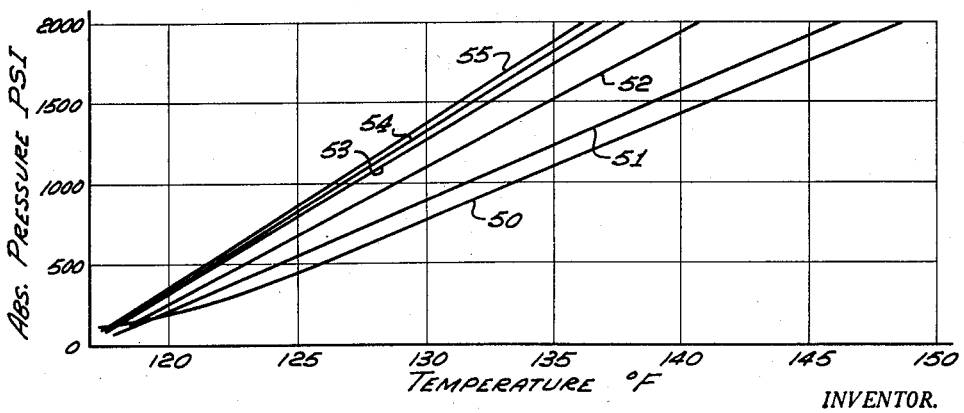

Figs. 2, 3 and 4 each shows a family of curves of pressure vs. temperature for exemplary mixtures usable in accordance with the present invention and showing the results of actual tests, the curves relating to mixtures of water with, respectively, methyl Carbitol (diethylene glycol monomethyl ether), methanol and ethanol.

Fig. 5 is a series of curves of the mixtures of Figs. 2, 3 and 4 showing the variation of incremental pressure change per unit temperature change for different proportions by weight of the mixtures.

Referring now in detail to Fig. 1, there is shown a system indicated generally at 10 and comprising a hollow container completely filled with liquid. One portion of the system 10 is a sensing element indicated generally at 12 which is connected through conduit 14 with a Bourdon tube 16. The Bourdon tube 16 in turn is adapted to make electrical contact at 18 upon an increase of pressure of liquid within the tube 16. Making of the contact at 18 serves to energize a signal means 20 by battery 22. The signal means 20 may take the form of a light, an audible alarm or may in turn serve to automatically initiate corrective action to prevent damage from the over temperature which caused the increased pressure in the system 10. It will be well understood by those skilled in the art that any similar type of signalling system may be employed and is within the contemplation of the present invention, the electrical circuit shown being exemplary. It will moreover be understood that the Bourdon tube 16 is itself only exemplary of means responsive to liquid pressure in a closed system for accomplishing a desired purpose such as making the contacts 18.

In the practice of the present invention the liquid filled system 10 is so constructed as to have virtually constant internal volume over a wide range of pressures and temperatures including the working range selected for the instrument. Desirably the variation of volume is not greater than about 5% of the volume of the system throughout a working pressure range of 150 to 2000 p.s.i. Also, in accordance with well known practice in the art, the volume of liquid within sensing means 12 is made as large as possible relative to the volume of liquid within the entire system 10. Moreover the sensing portion 12 may be made in any configuration to accord with a particular application. For example, it may be made relatively narrow and elongated if desired.

The liquid mixture within the system 10 may for example be made of water and a Carbitol such as methyl Carbitol (diethylene glycol monomethyl ether). In Fig. 2 there is shown a family of curves relating to the use of this mixture in a virtually constant volume pressurized system for practicing the present invention. The curve 30 represents the variation of pressure with temperature when the liquid within the system is water alone. The curve 31 represents similar data when the liquid within the system is methyl Carbitol alone. The remaining curves in Fig. 2, indicated at 32, 33, 34 and 35, represent similar data for varying proportions by weight of methyl Carbitol and water. Specifically curve 32 represents the performance of a mixture of 70% water and 30% methyl Carbitol. Curve 33 represents the performance of a mixture of 25% water and 75% methyl Carbitol. Curve 34 represents the performance of a mixture of 40% water and 60% methyl Carbitol. Curve 35 represents the performance of a mixture of 50% water and 50% methyl Carbitol.

It is to be noted in Fig. 2 that only curve 30, representing the performance of water alone in the system, displays any substantial deviation from a straight line or linear relationship, such deviation appearing at the lower end 36 of the curve 30. All the remaining curves of Fig. 2, as well as the major portion of curve 30 itself, are linear throughout the range shown. That is to say, each mixture displays a virtually constant incremental change of pressure per unit change of temperature throughout the working range. It may be noted that the portion 36 of curve 30 is due primarily to gas present in the water. Outgassing of the liquids used is highly desirable in the practice of the present invention but, as is well known, complete outgassing is extremely difficult to achieve. In the present invention, since the liquid mixture is pressurized and the working temperature range produces internal pressures of at least 150 p.s.i., the fact of slight non-linearity at very low pressures is of minor importance and may be neglected.

The slopes, or first derivatives, of the linear portions of the curves of Fig. 2 are measures of the efficacy of the respective mixtures for use in a temperature measuring system in accordance with the present invention. Thus the curve 35, having the steepest slope, yields the maximum incremental pressure change with unit temperature change of all the curves of Fig. 2. Computation of the value of this maximum incremental pressure change yields a figure of approximately 102 p.s.i./°F. It is to be understood that the specific values of pressure and temperature indicated by the curves of Fig. 2 are themselves irrelevant for purposes of the present invention; only the slopes of the curves through the working temperature range are important. As before noted, the usable working temperature range for practicing the present invention may be varied within wide limits by controlling the temperature and pressure conditions under which the system is initially charged.

Fig. 3 shows a family of curves generally similar to those of Fig. 2 just discussed except derived from tests of mixtures of methanol (methyl alcohol) and water. In Fig. 3 curve 40 represents data derived from a system having water alone, and corresponds to the curve 30 previously noted in Fig. 2. Curve 41 represents the performance of methanol alone in the pressurized system. Curves 42, 43, 44 and 45 represent the performance of mixtures comprising varying proportions of methanol and water. Curve 42 represents a mixture of 70% water and 30% methanol; curve 43 represents a mixture of 25% water and 75% methanol; curve 44 represents a mixture of 50% water and 50% methanol; and curve 45 represents a mixture of 40% water and 60% methanol. As before, all these percentages are by weight.

As was the case in Fig. 2, the curves of Fig. 3 also demonstrate virtually no departure from linearity throughout the working temperature range; only curve 40, representing water alone, displays non-linearity at its lower end 46. The steepest slope of the several curves of Fig. 3, is found in the case of curve 45. Computation of the incremental pressure change per unit temperature change of the mixture represented by curve 45 yields a figure of 83.5 p.s.i./°F.

Fig. 4 is a family of curves of varying proportions of ethanol (ethyl alcohol) and water, the tests having been conducted in the same manner as in the case of Fig. 2 and Fig. 3. Thus the curve 50 represents the performance of water alone in the system and curve 51 represents the performance of ethanol alone. Curves 52, 53, 54 and 55 represent the performance of varying mixtures of the two, curve 52 resulting from a mixture of 30% water and 70% ethanol; curve 53 representing 45% water and 55% ethanol; curve 54 representing 75% water and 25% ethanol; and curve 55 representing a mixture of 60% water and 40% ethanol. Again it will be noted that the curves of the several mixtures display virtually no departure from linearity throughout the working temperature range shown. The curve with the steepest slope, corresponding to the mixture producing the maximum incremental pressure changer per unit temperature change is curve 55, and computation of the incremental pressure change per unit temperature change yields a figure of 98 p.s.i./°F.

The data shown in Figs. 2, 3 and 4 are graphically summarized in the curves of Fig. 5 wherein the abscissae represent the percentage by weight of water in the mixtures used. The ordinates represent the incremental pressure change per unit temperature change of the liquid mixture and are expressed in pounds per square inch per degree Fahrenheit. The specific points in Fig. 5 from which the curves are plotted are those corresponding to the individual curves of Figs. 2, 3 and 4, the ordinate of each point in Fig. 5 being equal to the slope or first derivative of each curve of Figs. 2, 3 and 4.

It will be seen in Fig. 5 that the maximum incremental pressure change per unit temperature change in each of the mixtures illustrated occurs in the case of a mixture having at least 20% by weight of each of the component liquids. Thus the maximum point in the case of methanol occurs with a mixture of approximately 39% water and 61% methanol; the maximum for ethanol occurs with approximately 65% water and 35% ethanol; and with Carbitol the maximum occurs at 48% water and 52% Carbitol.

It is further to be noted in Fig. 5 that the incremental pressure change per unit temperature change of the liquid mixtures is for most proportions greater than that of one of the component liquids alone. Moreover, the maximum value of the incremental pressure change per unit temperature change for each mixture is substantially greater than that of each component liquid alone.

It will be understood that the specific mixtures hereinabove described are only exemplary of liquid mixtures having the physical characteristics just referred to within the contemplation of the present invention. Such mixtures may include quantities of other miscible liquids to achieve desirable physical properties such as variations in freezing point of the mixture, resistance to corrosion of the container and similar considerations. In each instance the complete mixture, when subjected to temperature variations within a pressurized virtually constant volume system, exhibits incremental pressure changes per unit temperature change substantially greater than that of any of the component liquids alone in such a system.

I claim:

1. In a temperature sensing system: a hermetically sealed virtually constant volume sensing container and movable chamber in communication therewith, said container and chamber constituting a closed, substantially gas-free system completely filled with a mixture of water and a water-miscible organic liquid at a pressure of not less than 150 p.s.i. absolute through a selected working temperature range, said mixture exhibiting an incremental pressure change per unit temperature change through said range which is appreciably greater than the incremental pressure change per unit temperature change at the same working temperatures exhibited by water and said organic liquid individually.

2. The invention as stated in claim 1 wherein said organic liquid is an alcohol.

3. The invention as stated in claim 1 wherein said organic liquid is an alcohol constituting between about 20% and 80% by weight of the mixture.

4. The invention as stated in claim 1 wherein said organic liquid is a Carbitol.

5. The invention as stated in claim 1 wherein said organic liquid is a Carbitol constituting between about 25% and 75% by weight of the mixture.

6. In a temperature sensing device the combination comprising a hollow hermetically tight container and signaling means responsive to pressure changes within the container, a liquid mixture filling the container, the liquid being at a pressure of at least 150 p.s.i. at the lower limit of a predetermined working temperature range, said liquid mixture including at least two component liquids, the incremental pressure change per unit temperature change of the mixture within a predetermined working temperature range being substantially greater than that of any of the component liquids alone.

7. A temperature sensing system comprising: a hermetically sealed container; a liquid mixture of at least two component liquids filling said container under an internal pressure of at least 150 p.s.i. absolute for a desired temperature range, said mixture exhibiting a pressure change with unit temperature change substantially greater than that of any of said component liquids alone; and means for indicating the pressure of said liquid mixture.

8. The invention as stated in claim 7 wherein the volume change within said system over the desired temperature range does not exceed about 5%.

9. The invention as stated in claim 7 wherein the weight of each of two of said component liquids is at least about 20% of the total weight of the mixture.

10. A temperature sensing system comprising: a hermetically sealed container; a liquid mixture of at least two mutually miscible component liquids filling said container, the pressure of the liquid mixture for a selected working temperature range being at least 150 p.s.i. absolute, one of said component liquids being water and another being an organic compound, the hydrostatic pressure increase with unit temperature increase of the mixture being substantially greater than that of either water or said other component liquid; and signaling means responsive to the hydrostatic pressure of said liquid mixture.

11. A temperature sensing device comprising a hollow temperature sensing element connected to and communicating with a means responsive to pressure changes within said element and said means, the internal volume of said element and said means being substantially constant with changes in temperature and changes in internal pressure, and said internal volume being at a pressure of at least 150 p.s.i. and being filled with a mixture of liquids having a greater change of pressure with change in temperature than any component of said mixture.

12. A temperature sensing system comprising: a hermetically sealed container including signaling means responsive to pressure within said container and a liquid mixture filling said container and consisting essentially of two component liquids under a pressure of at least 150 p.s.i., each of two of said component liquids constituting at least 20% by weight of the mixture, the incremental pressure change of the mixture per unit temperature change being greater than that of either of said component liquids alone.

13. A temperature sensing system comprising: a hermetically sealed container including signaling means responsive to pressure within the container and a liquid mixture filling said container under a pressure of at least 150 p.s.i. absolute for a desired temperature range, said mixture including as component liquids at least 20% by weight of another liquid miscible with water, the incremental pressure change of the liquid mixture for unit change of temperature being greater than for any component liquid alone.

14. The invention as stated in claim 13 wherein said other liquid is an organic compound.

15. The invention as stated in claim 13 wherein said other liquid is an alcohol.

References Cited in the file of this patent

UNITED STATES PATENTS

| | | |
|---|---|---|
| 1,797,258 | Crosthwait | Mar. 24, 1931 |
| 1,801,210 | Schlaich | Apr. 14, 1931 |
| 1,932,988 | Raney | Oct. 31, 1933 |
| 2,115,501 | Vernet | Apr. 26, 1938 |